Patented Nov. 18, 1941

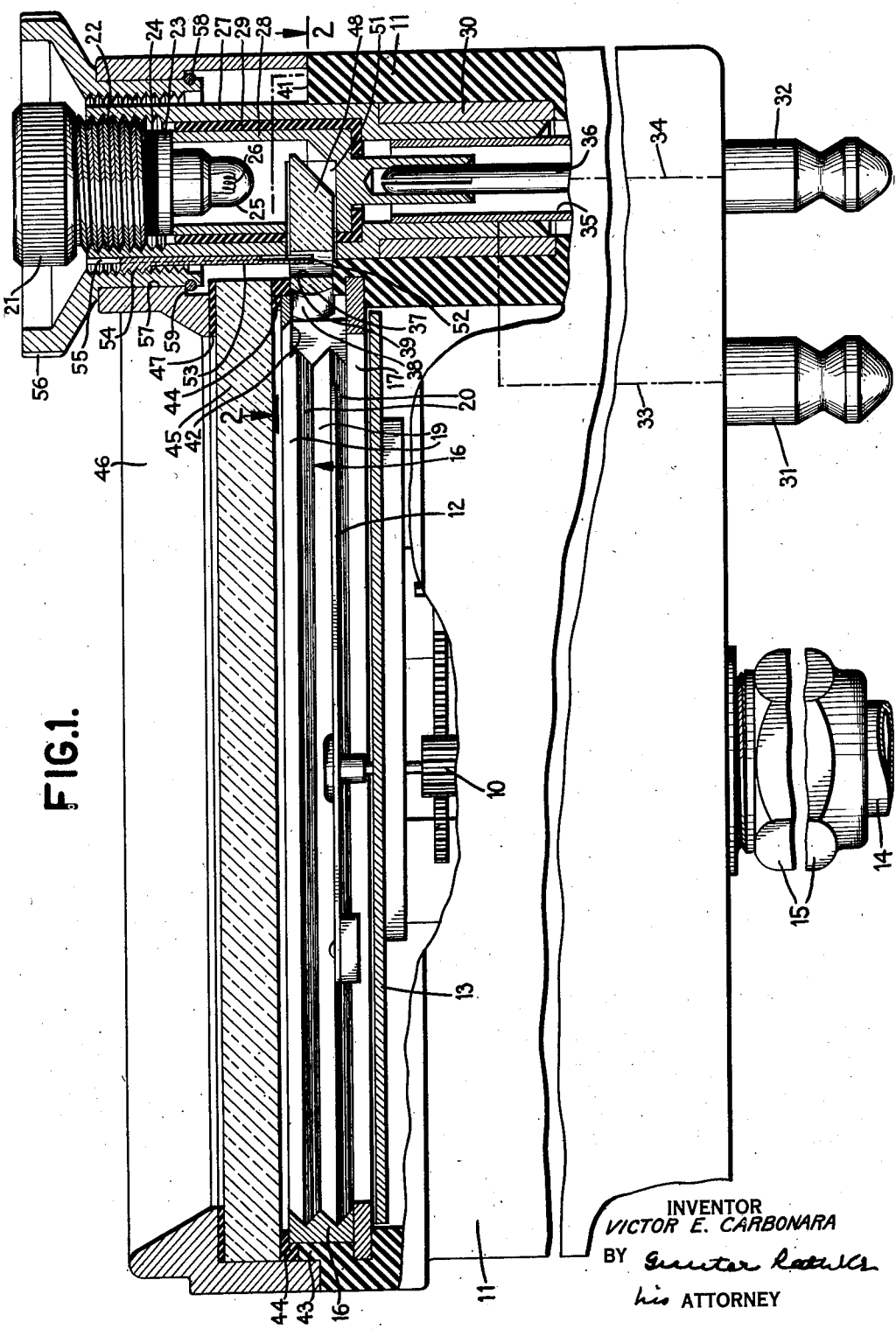

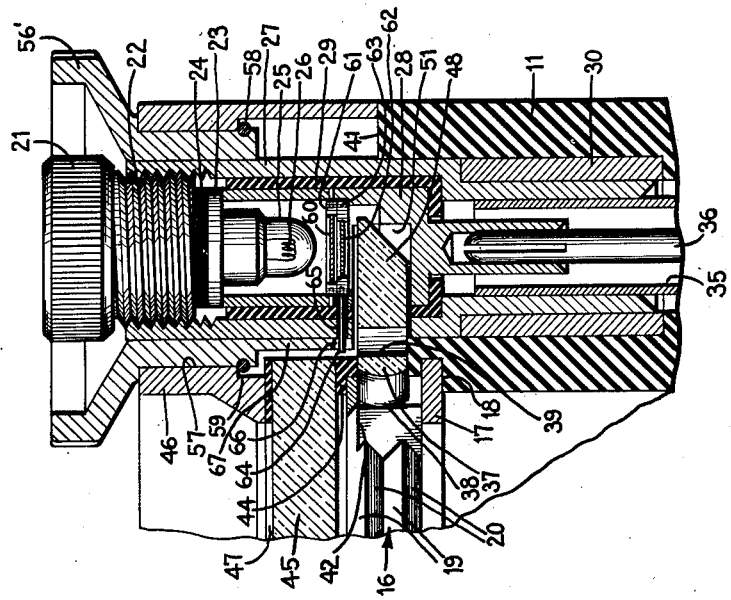

2,262,920

UNITED STATES PATENT OFFICE 2,262,920

ILLUMINATING MEANS FOR INSTRUMENTS

Victor E. Carbonara, Rockville Centre, N. Y., assignor, by mesne assignments, to Square D Company, Detroit, Mich., a corporation of Michigan Application December 15, 1938, Serial No. 245,825

21 Claims. (Cl. 240—2.1)

This invention relates to illuminating means for indicating instruments.

The invention aims at providing an improved illuminating system for evenly illuminating instrument dials such as, for example, the dials of aircraft instruments, without causing a glare in the eyes of an observer.

For aircraft instruments, for example, upon which the safety of flying greatly depends, it is required that an illuminating system do not impair the visibility of the instrument dial and further that the source of light, usually an electric miniature bulb, be readily replaceable without affecting the proper functioning of the instrument.

To meet these requirements, it has been found practical to provide a miniature electric light bulb which is inserted into an aperture at the rim of the instrument casing so as to be readily replaceable without the use of tools. An electric light bulb mounted in this position will not evenly illuminate the entire area of the dial or the area occupied by the graduation, as, according to an optical law, the light intensity decays in inverse proportion to the square of the distance from a source of light.

It is thus an object of this invention to provide in an instrument illuminating system optical refracting means for distributing light evenly over the area of the dial to be read.

More particularly, it is an object of this invention to provide, in combination with an instrument dial, an illuminating reflector positioned to reflect light onto the dial or the graduation thereon, the reflector receiving light from a source through an astigmatic optical refracting system.

It is a further object of this invention to provide for instruments requiring a pressure proof instrument casing an illuminating system wherein the source of light is replaceable without affecting the pressure proof enclosure of the instrument.

It is often desirable to adjust the intensity of the illumination of an instrument dial in response to light conditions of the environment. This is normally done by providing ballast resistors in series with the electric lamp bulb of the illuminating system requiring separately located means for adjusting such resistors.

As a further object, this invention aims at providing an illuminating system in which a source of light of preferably constant intensity is used in combination with adjustable optical light restricting means between the source of light and the dial.

Further aims, objects and advantages of this invention will appear from a consideration of the description which follows with accompanying drawings showing for purely illustrative purposes embodiments of this invention. It is to be understood, however, that the description is not to be taken in a limiting sense, the scope of this invention being defined in the appended claims.

Referring to the drawings:

Fig. 1 is a side elevation partly in section of an instrument equipped with an illuminating system according to this invention.

Fig. 2 is a section taken on line 2—2 of Fig. 1.

Fig. 3 shows in elevation an element of Figs. 1 and 2.

Fig. 4 is a detailed sectional elevation of a modified form of the invention.

In the drawings, the invention is shown as applied to a pressure responsive instrument enclosed within a pressure proof casing. An instrument mechanism 10 is mounted within a casing 11 operating a pointer 12 movable over a dial 13. The instrument may be connected to a source of varying pressure by means of a conduit 14 terminating in a pipe connection 15 of the casing.

A light reflecting member may be provided for reflecting light onto the portion of the dial to be illuminated. In the illustrated embodiment a reflecting ring 16 is held in place by means of a snap ring 17 inserted into a circumferential groove 18 in the casing. The reflector is preferably provided with a corrugated inner surface, the portions of the corrugations 19 facing the dial having a light reflecting and preferably diffusing surface, the portions 20 facing in the opposite direction being of light absorbing color.

A source of light is shown in the illustrated embodiment as being an electric miniature lamp which is further shown and described in greater detail in the Reissue Patent No. 20,937 to Paul Kollsman, dated December 6, 1938. This lamp comprises a base having a finger operable grip portion 21, a first contact element in the form of an externally screw threaded nipple 22 and a second contact element in the form of a ring 23 insulated from the nipple by means of an insulating washer 24. The base supports a bulb or globe 25 enclosing a filament 26.

The lamp base is mounted in a socket including a conducting external sleeve 27 which is internally threaded and forms a contact element complementary to the nipple 22. An internal sleeve 28 is insulated from the external sleeve 27 by means of a bushing 29 and forms a second contact element complementary to the ring 23 of the lamp base. The socket is firmly held in the casing 11 by means of a metallic ferrule 30.

For connection to a source of electrical energy, two plugs 31 and 32 are shown connected through leads 33 and 34 with the external and internal sleeves 27 and 28 respectively. The leads 33 and 34 are shown as terminating in a conducting tube 35 and a rod 36.

For projecting light onto the reflector 16, an astigmatic optical refracting system is used. In the embodiment illustrated, a lens 37 is interposed in the path of light between the lamp bulb and the reflector.

The lens 37 has a cylindrically curved front face 38 converging or focusing light onto the reflector. For the purpose of evenly distributing the light over the entire internal surface of the reflector, the lens is shown as being negatively curved in addition to its positive cylindrical curvature, thus diverging light in the manner of a fan over the entire reflector.

The illustrated lens may be defined as having converging properties with respect to a first plane and diverging properties with respect to a second plane normal to the first plane.

In order to maintain the negative curvature of the lens small, the lens may be formed as a biconcave lens having a concave rear face 39 negatively curved with respect to a first plane and plane with respect to a second plane normal to the first plane and a front face 38 which is concave with respect to a first plane and cylindrical with respect to a second plane normal to the first plane.

The lens may be conveniently so formed that the front face of the lens has a curvature corresponding approximately to the curvature of the reflector or the hollow of the casing. So formed, the lens will not project into the space over the dial and will be practically invisible to an observer of the instrument dial.

The curvature and the mounting of the lens are particularly well visible in Fig. 2 showing the lens inserted and preferably cemented into a recess 40 formed in the flange 41 of the instrument casing 11 and projecting light through an aperture 42 in the reflector 16.

The flange of the casing may be provided with a sealing face 43. The depth of the recess 40 into which the lens is cemented is preferably so selected with respect to the thickness of the lens 37 that the upper surface of the lens lies flush with the sealing face 43, thus making the upper face of the lens a part of a sealing surface against which a packing ring 44 bears.

The packing ring 44 supports a transparent window 45 which is pressed down by means of a cover 46 bearing against a pipe gasket 47. The operating mechanism 10 of the instrument is thus tightly sealed from the surrounding atmosphere by means of the casing 11, the lens 37 cemented into the casing and the glass window 45 bearing against the packing ring 44.

The astigmatic lens may directly receive light from the filament of the lamp bulb. In the illustrated embodiment, however, a prism 48 is shown for deflecting light received from the filament into the lens 37. The prism is shown as cemented to the lens 37 at 49 and 50 and extends into an aperture 51 cut into the lamp socket.

The lens and the prism in the illustrated embodiment thus form an optical unit and are preferably of semi-circular outline in plan view as to fit into the aperture 40 which may suitably be formed by milling.

The prism 48 serves various purposes.

It is a condition for efficient illumination that the dimension of the astigmatic image produced on the reflector should not exceed the width of the reflector. However, since the dimensions of a lamp filament cannot be reduced below practical limits and as the magnification ratio determining the size of the image is a function of the distances of the filament from the lens, it appears that a reduction in size of the image of the filament can only be obtained by an increase of the distance of the lamp filament from the lens.

The generally accepted standards defining the over-all dimensions of the instrument into which the illuminating system is to be installed do not permit a mounting of the bulb at considerable radial distance from the lens. This structural difficulty is overcome by deflecting the optical path by means of a prism which permits an increase in the distance between the filament and the refracting faces of the lens. In this manner, the prism permits the astigmatic image to be maintained small enough as not to exceed the dimensions of the reflector.

It is desirable to obtain a properly focused image of the lamp filament simply by inserting the bulb into the socket without any additional adjustment. This is also accomplished by means of the prism.

In the manufacture of lamp bulbs considerable longitudinal tolerances occur in the distance of the filament from the lamp base. The tolerances in the lateral of the filament from the central axis of the lamp, however, are small. The relatively great longitudinal deviations of the filament which would otherwise result in considerable variations in the position of the image are eliminated by the prism which causes the front view of the filament to be properly focused onto the reflector unaffected by any longitudinal deviations of the filament which may occur.

Light restricting means may be provided for adjusting the intensity of the illumination in response to the light conditions of the surroundings without varying the temperature of the filament.

In the illustrated embodiment of Fig. 1, a shutter or diaphragm 52 extends into the space between the prism and the lens and is adjustable in its position by means of a rod 53 provided with a screw-threaded portion 54. The rod 53 is guided in a longitudinal recess 55 in the external sleeve 27.

An adjusting knob 56 rotatably mounted in a bore 57 of the cover 46 is provided with internal screw threads engaging with the threaded portion 54 of the shutter. A snap ring 58 bearing against a shoulder 59 in the cover 46 is shown for preventing an axial movement of the knob.

When the knob is turned in one or the opposite direction, the shutter 52 covering preferably the entire width of a curved face of the lens is raised or lowered in the gap between the lens and the prism thereby restricting the path of light rays to the lens resulting in an even adjustment of the intensity of illumination.

In a modified form of the invention illustrated in Fig. 4, the light restricting property of a polarizing medium is utilized for the purpose of varying the intensity of the light admitted to the lens.

A first sheet 60 of a polarizing medium such as "Polaroid" is fixedly mounted in the internal sleeve 28 by means of a frame or mounting ring 61, part of the ring being shown as broken away. A second sheet of a polarizing medium 62 is mounted for rotation relatively to the first sheet in a frame or ring 63, a part of the ring being shown as broken away.

For rotating the second polarizing medium relatively to the first, a pin 64 is shown inserted into the rim of the ring 63 passing through a 90°-slot 65 in the internal and the external sleeves and the insulating bushing therebetween and engaging with a longitudinal notch 66 in an extension 67 of an adjusting knob 56'.

When the two sheets of polarizing material are in optical alignment a maximum of light is admitted to the lamp. If the two sheets are rotated relatively to each other, the intensity of light is gradually diminished until zero after a rotation of 90° relatively to the position in which a maximum of light is admitted through the sheets.

Obviously the present invention is not restricted to the particular embodiments herein shown and described. Moreover, it is not indispensable that all the features of this invention be used conjointly, since they may advantageously be employed in various combinations and sub-combinations.

What is claimed is:

1. The combination with an instrument dial; of a reflector arranged to reflect light onto said dial; and an astigmatic optical refracting system converging with respect to a first plane and diverging with respect to a second plane normal to said first plane, said system being arranged to project light from a source onto said reflector.

2. The combination with a circular instrument dial; of a reflector positioned adjacent to the rim of said dial; and an astigmatic optical refracting system converging with respect to a first plane and diverging with respect to a second plane normal to said first plane, said system being arranged to project light from a source onto said reflector.

3. The combination with a circular instrument dial; of a reflector positioned adjacent to the rim of said dial; and a double-concave lens, a concave face of which is also positively curved, said lens being arranged with the axes of negative curvature normal to, and the axis of positive curvature parallel to, the dial, thereby projecting light from a source onto said reflector.

4. The combination with a circular instrument dial; of a reflector positioned adjacent to the rim of said dial; an electric light bulb having a filament; and a compound lens divergent with respect to a first plane and convergent with respect to a second plane normal to the first plane, said lens being arranged to project an astigmatic image of said filament onto said reflector.

5. The combination with a circular instrument dial; of a reflector ring positioned adjacent to the rim of said dial; an electric light bulb having a filament; and a double-concave lens, the concave face of which nearest to the reflector is also positively curved, the axes of negative curvature being normal to, and the axis of positive curvature being parallel to, the plane of said reflector ring, thereby projecting an astigmatic image of said filament onto said reflector.

6. The combination with a circular instrument dial; of a ring-shaped reflector surrounding said dial said reflector having a gap in its circumference; and a compound lens divergent with respect to a first plane and convergent with respect to a second plane normal to the first plane, said lens being mounted to project light through the gap in said reflector and having a negative curvature approximately equal to the curvature of the reflector, said lens projecting light from a source onto said reflector.

7. The combination with a circular instrument dial; of a ring-shaped reflector surrounding said dial said reflector having a gap in its circumference; an electric lamp bulb having a filament; and a compound lens divergent with respect to a first plane and convergent with respect to a second plane normal to the first plane, said lens being mounted to project light through the gap in said reflector and having a negative curvature approximately equal to the curvature of the reflector, said lens projecting an astigmatic image of said filament onto said reflector.

8. The combination with a circular instrument dial; of a ring-shaped reflector surrounding said dial said reflector having a gap in its circumference, the reflector being provided with a corrugated inner surface, the portions of the corrugations facing the dial being light reflecting, the portions facing in the opposite direction being light absorbing; and a compound lens divergent with respect to a first plane and convergent with respect to a second plane normal to the first plane, said lens being mounted to project light through the gap in said reflector and having a negative curvature approximately equal to the curvature of the reflector, said lens projecting light from a source onto said reflector.

9. The combination with a circular instrument dial; of a ring-shaped reflector surrounding said dial said reflector having a gap in its circumference; an electric lamp bulb having a filament; and a compound lens divergent with respect to a first plane and convergent with respect to a second plane normal to the first plane, said lens being mounted to project light through the gap in said reflector and having a negative curvature approximately equal to the curvature of the reflector, said lens projecting an astigmatic image of said filament onto said refector.

10. In an instrument illuminating system the combination of an instrument casing having a transparent window and an aperture opening toward the front of said casing; first contact elements in said aperture completing said aperture to form a lamp socket; a circular dial visible through said window; a reflector positioned adjacent to the rim of said dial; a lamp having second contact elements complementary to said first elements, a filament, and a glass bulb of smaller diameter than said aperture enclosing said filament, said lamp being insertable from the front of the casing into said socket; and a compound lens divergent with respect to a first plane and convergent with respect to a second plane normal to the first plane arranged to project an astigmatic image of said filament onto said reflector.

11. In an instrument illuminating system the combination of an instrument casing having a transparent window and an aperture opening toward the front of said casing; first contact elements in said aperture completing said aperture to form a lamp socket; a circular dial visible through said window; a ring-shaped reflector surrounding said dial said reflector having a gap in its circumference; a lamp having second contact elements complementary to said first elements, a filament, and a glass bulb of smaller diameter than said aperture enclosing said filament, said lamp being insertable from the front of the instrument into said socket; and a compound lens divergent with respect to a first plane and convergent with respect to a second plane normal to the first plane, said lens being mounted to project light through the gap in said reflector and having a negative curvature approximately equal to the curvature of the reflector, said lens projecting light from said filament onto said reflector.

12. In an instrument illuminating system the combination of an instrument casing having a transparent window and an aperture opening toward the front of said casing; first contact elements in said aperture completing said aperture to form a lamp socket; a circular dial visible through said window; a ring-shaped reflector surrounding said dial and having a gap in its circumference, the reflector being provided with a corrugated inner surface, the portions of said corrugations facing the dial being light reflecting, the portions facing in the opposite direction being light absorbing; a lamp having second contact elements complementary to said first elements, a filament, and a glass bulb of smaller diameter than said aperture enclosing said filament, said lamp being insertable from the front of the instrument into said socket; and a compound lens divergent with respect to a first plane and convergent with respect to a second plane normal to the first plane, said lens being mounted to project light through the gap of said reflector and having a negative curvature approximately equal to the curvature of the reflector, said lens projecting light from said filament onto said reflector.

13. In an instrument illuminating system the combination of an instrument casing having a transparent window and an aperture opening toward the front of said casing; first contact elements in said aperture comleting said aperture to form a lamp socket; a circular dial visible through said window; a reflector positioned adjacent to the rim of said dial; a lamp having second contact elements complementary to said first elements, a filament, and a glass bulb of smaller diameter than said aperture enclosing said filament, said lamp being insertable from the front of said casing into said socket; a prism projecting into said aperture to receive light from said filament, and a compound lens divergent with respect to a first plane and convergent with respect to a second plane normal to the first plane arranged to project rays from said filament deflected by said prism onto said reflector.

14. In an instrument illuminating system the combination of an instrument casing having a transparent window and an aperture opening toward the front of said casing; first contact elements in said aperture completing said aperture to form a lamp socket; a circular dial visible through said window; a ring-shaped reflector surrounding said dial said reflector having a gap in its circumference; a lamp having second contact elements complementary to said first elements, a filament, and a glass bulb of smaller diameter than said aperture enclosing said filament, said lamp being insertable from the front of the instrument into said socket; a prism projecting into said aperture to receive light from said filament; and a compound lens divergent with respect to a first plane and convergent with respect to a second plane normal to the first plane, said lens being mounted to project light through the gap in said reflector and having a negative curvature approximately equal to the curvature of the reflector, said lens projecting light deflected by said prism onto said reflector.

15. In an instrument illuminating system the combination of an instrument casing having a transparent window and an aperture opening toward the front of said casing; first contact elements in said aperture completing said aperture to form a lamp socket; a circular dial visible through said window; a ring-shaped reflector surrounding said dial and having a gap in its circumference, the reflector being provided with a corrugated inner surface, the portions of said corrugations facing the dial being light reflecting, the portions facing in the opposite direction being light absorbing; a lamp having second contact elements complementary to said first elements, a filament, and a glass bulb of smaller diameter than said aperture enclosing said filament, said lamp being insertable from the front of the instrument into said socket; a prism projecting into said aperture to receive light from said filament; and a compound lens divergent with respect to a first plane and convergent with respect to a second plane normal to the first plane, said lens being mounted to project light through the gap in said reflector and having a negative curvature approximately equal to the curvature of the reflector, said lens being arranged to project light deflected by said prism onto said reflector.

16. In an instrument illuminating system the combination with an electric lamp bulb and a substantially plane dial to be illuminated thereby; of light transmitting means interposed in the optical path between said bulb and said dial, said means including a double-concave lens, a concave face of which is also positively curved, the axes of negative curvature of said lens being normal to, and the axis of positive curvature being parallel to, the plane of said dial.

17. In an instrument illuminating system the combination with an electric lamp bulb and a substantially plane dial to be illuminated thereby; of light transmitting means interposed in the optical path between said bulb and said dial, said means including a double-concave lens, the concave face of which through which light emerges is also positively curved the lens being arranged with its axes of negative curvature normal to, and the axis of positive curvature parallel to, the plane of said dial; and a prism deflecting light from the bulb into said lens.

18. An article of manufacture comprising, in combination, an instrument casing having a front flange providing an annular sealing face, said flange having a recess cut therein interrupting said sealing face; a concave lens cemented into said recess to lie flush with the sealing face, the concave lens having a curvature approximately equal to the curvature of the internal bounding edge of the flange; a miniature lamp socket mounted on said flange outside said sealing face and adjacent to said recess, the lamp socket having an aperture permitting an emission of light from a bulb insertable therein to said lens; a glass window; a sealing gasket; and a cover for holding said window and gasket tightly against said sealing flange.

19. An article of manufacture comprising, in combination, an instrument casing having a front flange providing an annular sealing face, said flange having a recess cut therein interrupting said sealing face; a double-concave lens cemented into said recess to lie flush with said sealing face, the concave lens having a concave refracting face having a curvature approximately equal to the curvature of the internal bounding edge of the flange, the said refracting face being also positively curved; a miniature lamp socket mounted on said flange outside said sealing face and adjacent to said recess, the lamp socket having an aperture permitting an emission of light from a bulb insertable therein to said lens; a glass window, a sealing gasket; and a cover for holding said window and gasket tightly against said sealing flange.

20. An article of manufacture comprising, in combination, an instrument casing having a front flange providing an annular sealing face, said flange having a recess cut therein interrupting said sealing face; a miniature lamp socket mounted on said flange outside said sealing face and adjacent said recess, said socket having an aperture opening towards said recess; a double-concave lens cemented into said recess to lie flush with said sealing face, the concave lens having a concave refracting face of a curvature approximately equal to the curvature of the internal bounding edge of the flange, the said refracting face being also positively curved; a prism extending into said aperture to receive rays of light from a bulb inserted into said socket and to deflect the said rays into said lens; a glass window; a sealing gasket; and a cover for holding said window and gasket tightly against said sealing face.

21. An instrument illuminating system comprising, in combination, an instrument casing having a front flange providing an annular sealing face, said flange having a recess cut therein interrupting said sealing face; a miniature lamp socket mounted on said flange outside said sealing face and adjacent said recess, said socket having an aperture opening towards said recess; a double-concave lens cemented into said recess to lie flush with said sealing face, the concave lens having a concave refracting face of a curvature approximately equal to the curvature of the internal bounding edge of the flange, the said refracting face being also positively curved; a prism extending into said aperture to receive rays of light from a bulb inserted into said socket and to deflect the said rays into said lens; a reflecting ring arranged in the same plane with the said lens, said reflecting ring having a corrugated inner surface, the portions of the corrugations facing in one direction being light reflecting, the portions facing in the opposite direction being light absorbing; a dial facing the light reflecting portions of the corrugations of the reflecting ring; a sealing gasket; and a cover for holding said window and gasket tightly against said sealing face.

VICTOR E. CARBONARA.